(12) United States Patent
Jeon et al.

(10) Patent No.: US 10,795,077 B2
(45) Date of Patent: Oct. 6, 2020

(54) DISPLAY APPARATUS

(71) Applicant: SAMSUNG ELECTRONICS CO., LTD., Suwon-si (KR)

(72) Inventors: Tae-hee Jeon, Namyangju-si (KR); Dae-young Kim, Suwon-si (KR); Hyung-ki Kim, Anyang-si (KR); Gong-hee Lee, Seoul (KR); Duk-jin Jeon, Bucheon-si (KR); Jai-ho Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/114,805

(22) Filed: Aug. 28, 2018

(65) Prior Publication Data

US 2019/0121020 A1    Apr. 25, 2019

(30) Foreign Application Priority Data

Oct. 24, 2017    (KR) .................. 10-2017-0138402

(51) Int. Cl.
*G02B 6/00*    (2006.01)
*F21V 8/00*    (2006.01)
(Continued)

(52) U.S. Cl.
CPC ......... *G02B 6/0095* (2013.01); *G02B 6/0055* (2013.01); *G02B 6/0088* (2013.01);
(Continued)

(58) Field of Classification Search
CPC .......... G02F 2001/133317; G02F 2001/133332; G02F 2001/133328; G02F 1/133308;
(Continued)

(56) References Cited

U.S. PATENT DOCUMENTS

2009/0174996 A1* 7/2009 Park ..................... H05K 5/0017
361/679.21
2012/0063168 A1    3/2012 Nambu et al.
(Continued)

FOREIGN PATENT DOCUMENTS

JP      2014-038318 A    2/2014
KR    10-2007-0066003 A    6/2007
(Continued)

OTHER PUBLICATIONS

Communication dated Apr. 1, 2019, issued by the European Patent Office in counterpart European Application No. 18189392.6.

*Primary Examiner* — Y M. Quach Lee
(74) *Attorney, Agent, or Firm* — Sughrue Mion, PLLC

(57) ABSTRACT

A display apparatus includes a display panel, a light guide plate disposed behind the display panel, the light guide plate being lengthwise or widthwise smaller than the display panel, a light source disposed adjacent to a first lateral surface of the light guide plate and irradiates light onto the first lateral surface, a back chassis disposed behind the light guide plate and supports a back surface of the light guide plate and a support structure disposed along a second lateral surface of the light guide plate different from the first lateral surface of the light guide plate. Further, the support structure includes light blocking protrusion that blocks a portion of the second lateral surface.

20 Claims, 17 Drawing Sheets

(51) Int. Cl.
*G02F 1/1333* (2006.01)
*G02F 1/13357* (2006.01)

(52) U.S. Cl.
CPC .. *G02F 1/133308* (2013.01); *G02F 1/133611* (2013.01); *G02F 1/133615* (2013.01)

(58) Field of Classification Search
CPC ......... G02F 1/133608; G02F 1/133611; G02B 6/0095; G02B 6/0025; G02B 6/0031; G02B 6/0055; G02B 6/0088
See application file for complete search history.

(56) References Cited

U.S. PATENT DOCUMENTS

| | | |
|---|---|---|
| 2014/0192554 A1 | 7/2014 | Tomomasa |
| 2015/0160399 A1 | 6/2015 | Tokuyama et al. |
| 2016/0073536 A1 | 3/2016 | Zhao et al. |
| 2016/0195673 A1 | 7/2016 | Yoon et al. |
| 2016/0231501 A1* | 8/2016 | Horiguchi ............ G02B 6/0088 362/633 |
| 2017/0123138 A1* | 5/2017 | Sasaki ................. G02B 6/0031 362/633 |
| 2018/0143394 A1 | 3/2018 | Tomizuka et al. |

FOREIGN PATENT DOCUMENTS

| | | |
|---|---|---|
| KR | 10-0900464 B1 | 6/2009 |
| KR | 10-1292585 B1 | 8/2013 |
| KR | 10-1405049 B1 | 6/2014 |
| KR | 10-2017-0037769 A | 4/2017 |
| WO | 2017002166 A1 | 1/2017 |

\* cited by examiner

DISPLAY APPARATUS

CROSS-REFERENCE TO RELATED APPLICATION

This application claims priority from Korean Patent Application No. 10-2017-0138402, filed on Oct. 24, 2017, in the Korean Intellectual Property Office, the disclosure of which is incorporated herein by reference in its entirety.

BACKGROUND

1. Field

Apparatuses and methods consistent with the disclosure relate to a display apparatus, and more particularly, to a display apparatus including a light source disposed along an edge of a light guide plate and a display panel which is disposed at an optical distance in front of the light guide plate.

2. Description of the Related Art

Recently, a non-luminous type Liquid Crystal Display (LCD), which uses a back light unit, takes up a large part of the display market.

The back light unit is classified into a direct type back light unit, which includes a light source disposed in back of a light guide plate, and an edge type back light unit, which includes a light source disposed along an edge of the light guide plate. Currently, a new edge type back light unit is being developed.

Since the edge type back light unit only uses light emitted to a front surface (or an emission surface) of the light guide plate, the light guide plate is designed in a size larger than or equal to a size of a display panel. Therefore, in the edge type back light unit, an apparatus may be fixed to the edge of the light guide plate.

In this case, since a side of the light guide plate is covered with the apparatus, light emitted from the side of the light guide plate is not irradiated onto a back surface of the display panel. Therefore, the light emitted from the side of the light guide plate is not seen through a screen.

However, in case of the new edge type back light unit where the light guide plate is designed in a size smaller than the size of the display panel, strong light emitted from the side of the light guide plate is irradiated onto the back surface of the display panel, and thus left and right sides of the screen look bright.

Nevertheless, when left and right sides of the light guide plate are covered with a holder which is disposed between the display panel and the light guide plate, light which is to be emitted to the side of the light guide plate is completely blocked out, and thus the left and right sides of the screen darken.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

Furthermore, one or more embodiments of the disclosure provides a display apparatus for preventing a light bounce phenomenon caused by light emitted from side light of a light guide plate by appropriately adjusting brightness of left and right sides of a screen by covering at least a portion of light emitted from a side of the light guide plate.

According to an embodiment, there is provided a display apparatus comprising a display panel, a light guide plate disposed behind the display panel, the light guide plate being lengthwise or widthwise smaller than the display panel, a light source configured to emit light to a first lateral surface of the light guide plate, a back chassis disposed behind the light guide plate and configured to accommodate a back surface of the light guide plate and a support structure disposed along a second lateral surface of the light guide plate different from the first lateral surface of the light guide plate, the support structure comprising a light blocking protrusion configured to block a portion of the second lateral surface.

The light blocking protrusion comprises a plurality of light blocking protrusions which are spaced apart from each other along a lengthwise direction of the support structure and protrude from an end of the support structure towards the light guide plate.

A distance between adjacent light blocking protrusions, among the plurality of light blocking protrusions maybe equal.

A first distance between a first pair of light blocking protrusions of the plurality of light blocking protrusions which are adjacent to each other maybe smaller than a second distance between a second pair of light blocking protrusions which are adjacent to each other, the light source being closer to the first pair of light blocking protrusions than the second pair of light blocking protrusions.

A first distance measured between adjacent light blocking protrusions, among the plurality of light blocking protrusions, may gradually increase as a second distance measured between the light source and the respective adjacent light blocking protrusions increases.

A width of a first plurality of light blocking protrusions, among the plurality of light blocking protrusions is wider than a width of a second plurality of light blocking protrusions, among the plurality of light blocking protrusions, the light source maybe closer to the first plurality of light blocking protrusions than the second plurality of light blocking protrusions.

The plurality of light blocking protrusions may protrude from the support structure toward the light guide plate and may cover portions of a light emission surface of the light guide plate.

The plurality of light blocking protrusions may have widths which gradually decrease toward the light guide plate.

Lengths of the plurality of light blocking protrusions which protrude toward the light guide plate may gradually shorten as a distance between the light source and a respective light blocking protrusion increases.

The plurality of light blocking protrusions may comprise a first group of light blocking protrusions which are adjacently disposed with a first distance between each other and a second group of light blocking protrusions which are disposed farther away from the light source than the first group, and are adjacently disposed with a second distance between each other.

A lower portion of each of the plurality of light blocking protrusions may form a "﹁" shape, which reflects light to the first end surface of the light guide plate.

A first height of a first light blocking protrusion, among the plurality of light blocking protrusions is higher than a second height of a second light blocking protrusion, among the plurality of light blocking protrusions, the light source being closer to the first light blocking protrusion than the second light blocking protrusion.

The plurality of light blocking protrusions may have heights which are gradually lowered as a distance between the light source and a respective light blocking protrusion increases.

The plurality of light blocking protrusions may comprise a first group of light blocking protrusions which have a first height and a second group of light blocking protrusions which have a second height lower than the first height, the light source maybe closer to the first group than the second group.

The plurality of light blocking protrusions may further comprise a third group of light blocking protrusions which are disposed farther away from the light source than the second group and have a third height lower than the second height.

The first group of light blocking protrusions maybe arranged in a first area of the support structure, the second group of light blocking protrusions maybe arranged in a second area of the support structure, and the third group of light blocking protrusions maybe arranged in a third area of the support structure, the first, second and third groups of the light blocking protrusions maybe arranged to gradually reduce an amount of light emitted from the second lateral surface as distance from the light source increases.

The support structure may comprise a fourth area where the plurality of light blocking protrusions are not formed, the fourth area maybe adjacent to a side of the light guide plate positioned opposite to the first lateral surface of the light guide plate.

The support structure may comprise a light guide surface which slopes from the light guide plate toward the display panel and guides light diffused from the first lateral surface of the light guide plate toward the display panel. The plurality of light blocking protrusions may protrude from the light guide surface.

An additional support structure maybe disposed along third lateral surface of the light guide plate positioned opposite to the second lateral surface of the light guide plate and configured to block a portion of the third lateral surface.

According to an embodiment, there is provided a display apparatus comprising a display panel, a light guide plate disposed behind the display panel, the light guide plate being lengthwise or widthwise smaller than the display panel, a light source configured to emit light to the light guide plate, a back chassis disposed behind the light guide plate and configured to accomodate a back surface of the light guide plate, a left support structure disposed along a left end of the light guide plate and a right support structure disposed along a right end of the light guide plate, wherein each of the left support structure and right support structure comprises a plurality of light blocking protrusions which respectively protrude to block a portion of the light guide plate along the left end and a portion of the light guide plate along the right end.

According to an embodiment, there is provide a display apparatus comprising a display panel, a light guide plate, a light source arranged at a first lateral surface of the light guide plate and a plurality of blocking members arranged along a second lateral surface of the light guide plate, wherein the plurality of blocking members are disposed to block light emitted towards the display panel and emitted from the second lateral surface of the light guide plate.

A width of light guide plate maybe less than a width of the display panel.

A size of each of plurality of blocking members may vary based on a distance of the respective blocking member from the light source.

A distance between adjacent blocking members, among the plurality of blocking members, may vary based on a distance of the adjacent blocking member from the light source.

The display apparatus may further comprises: a guide member which slopes from the light guide plate toward the display panel in the width direction and guides the light emitted from the light guide plate towards an outer portion of the display panel.

According to an exemplary embodiment, a display apparatus comprising: a display panel, a light guide plate, a light source arranged at a first lateral surface of the light guide plate and a support structure comprising a plurality of protrusions arranged along a second lateral surface of the light guide plate, wherein the plurality of protrusions are disposed to block light emitted towards the display panel and emitted from the second lateral surface of the light guide plate and a light emitting surface of the light guide plate disposed between the first lateral surface of the light guide plate and the second lateral surface of the light guide plate.

A width of the light guide plate maybe less than a width of the display panel.

A size of each of plurality of protrusions may vary based on a distance of the respective protrusion from the light source.

A space between adjacent protrusions, among the plurality of protrusions, may vary based on a distance of the adjacent protrusions from the light source.

The support structure may slope from the light guide plate toward the display panel in the width direction and may guide light emitted from the light guide plate toward an outer portion of the display panel.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the disclosure will be more apparent by describing certain embodiments of the disclosure with reference to the accompanying drawings, in which.

DETAILED DESCRIPTION OF THE EMBODIMENTS

Figure 1:
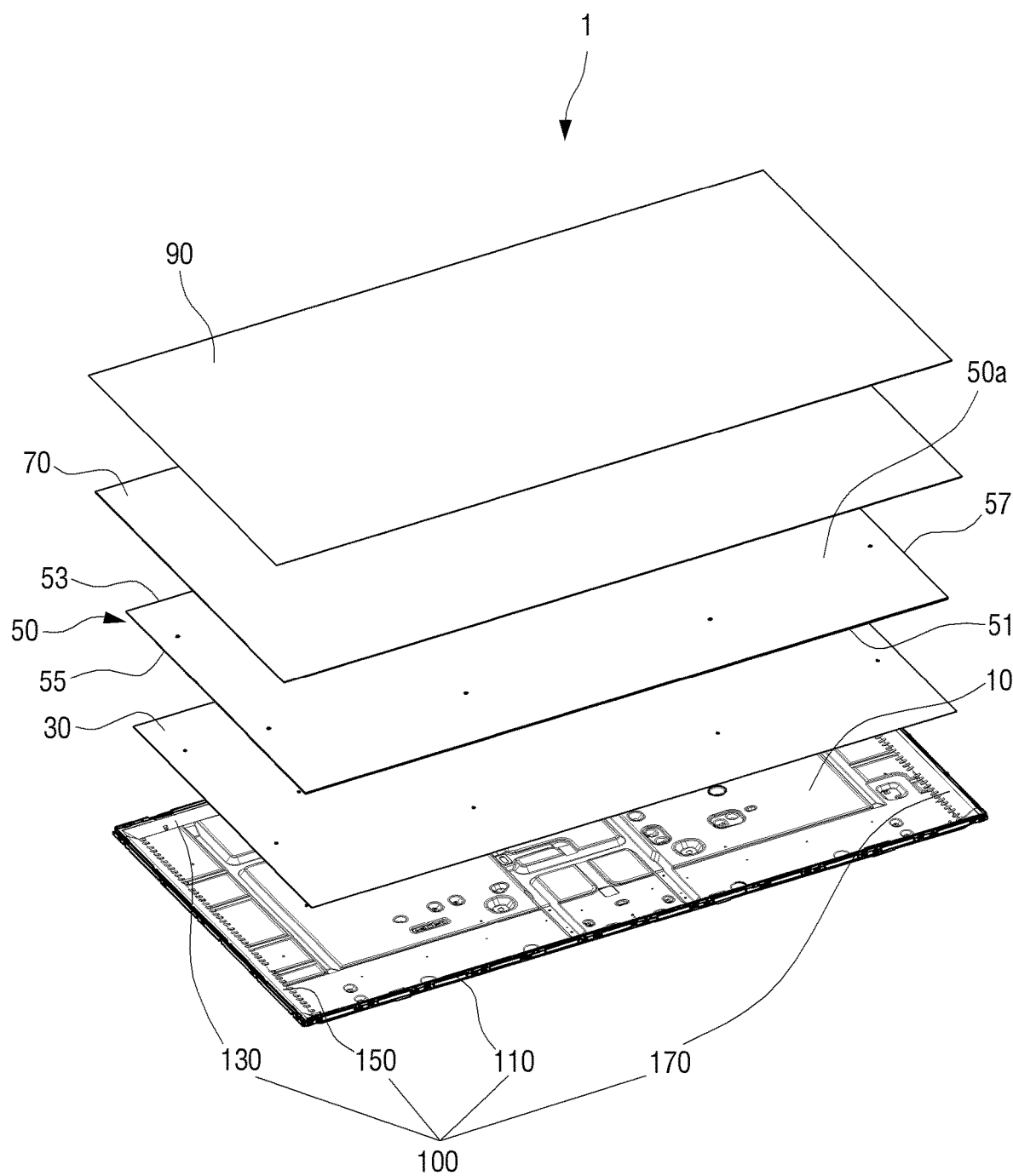
FIG. 1 is an exploded perspective view illustrating a display apparatus according to an embodiment of the disclosure.

Certain embodiments of the disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the embodiments of the disclosure may be carried out without those specifically defined matters. Also, well-known functions or constructions are not described in detail since they would obscure the disclosure with unnecessary detail.

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the drawings, elements are enlarged in sizes for description convenience, and ratios of the elements thicknesses of layers and regions may be exaggerated or downsized.

Although the terms, 'first', 'second', etc. may be used herein to describe various elements, these elements may not be limited by these terms. These terms are merely used to distinguish one element from another. For example, a first element may be termed a second element, and, similarly, a second element may be termed a first element, without departing from the scope of embodiments.

The singular forms are intended to include the plural forms as well, unless the context clearly indicates otherwise. The terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The terminology used herein may be understood as meanings which are commonly known to those skilled in the art, unless the context clearly indicates otherwise.

A display apparatus according to an embodiment of the disclosure includes a new edge type back light unit and a light guide plate having a size smaller than a display panel.

The new edge type back light unit secures an optical distance between the light guide plate and the display panel by supporting edges of the light guide plate and the display panel between the light guide plate and the display panel.

A holder includes a lower member, an upper member, a left member, and a right member of the display apparatus which may be manufactured in mutually separated states and which are respectively disposed at a lower edge, an upper edge, a left edge, and a right edge of a back chassis disposed in back of the light guide plane.

The display apparatus according to the embodiment of the disclosure may adjust an amount of light irradiated to each part of the display panel or a total amount of light irradiated to the display panel by covering at least portions of light emitted from a left surface and a right surface of the light guide plate by the left member and the right member. By adjusting the amount of light irradiated to the display panel as described above, light bounce phenomena occurring on a left side and a right side of a screen may be resolved.

For adjusting the amount of light, each of the left member and the right member includes a plurality of light blocking protrusions which are arranged in approximately sawtoothed shapes. The plurality of light blocking protrusions are formed at preset distances from one another on a slope light guide surface for guiding light emitted from a side of the light guide plate to the display panel.

In detail, the plurality of light blocking protrusions may adjust amounts of light irradiated to the left side and the right side of the display panel by blocking portions of light respectively emitted from the left side surface and the right surface of the light guide plate. This light amount adjustment may be performed by respectively adjusting distances between the light blocking protrusions, widths of the light blocking protrusions, lengths of the light blocking protrusions protruding toward the light guide plate, or heights of the light blocking protrusions protruding toward the display panel. Also, various light amount adjusting apparatuses may be embodied by using at least two or more of various conditions for the light amount adjustment mixed with each other.

A structure of a display apparatus according to an exemplary embodiment of the disclosure will be described in detail with reference to the attached drawings.

Figure 2:
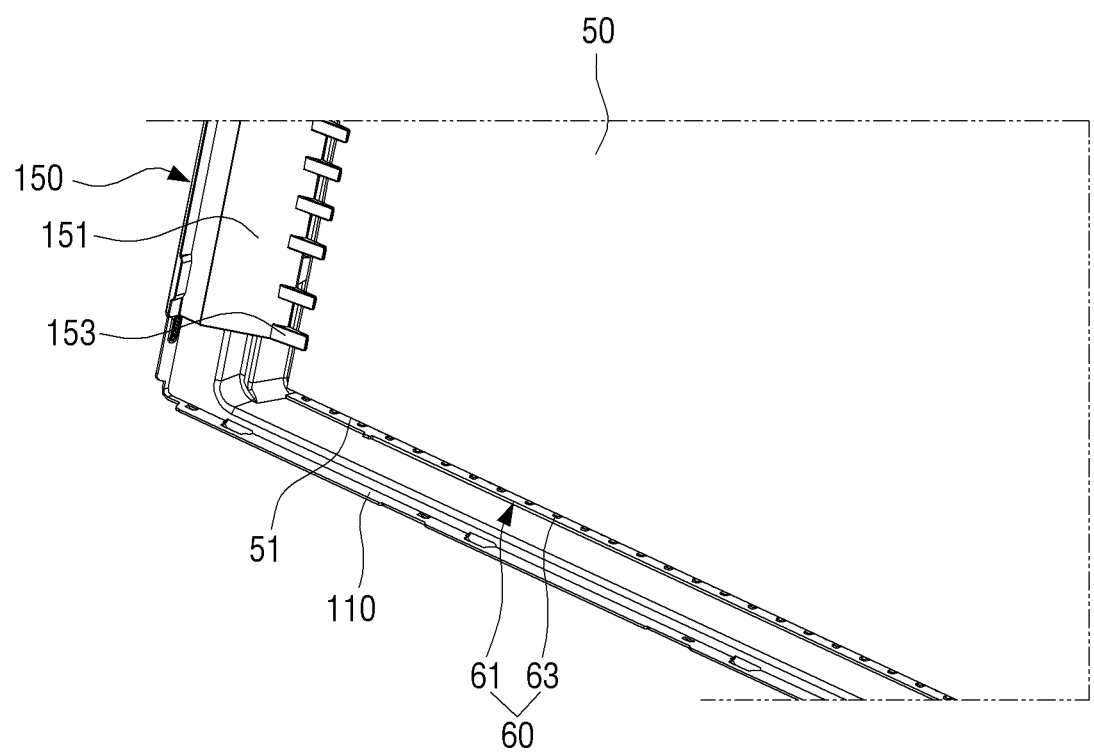
FIG. 2 is a partially enlarged perspective view illustrating a light source which is arranged along a lower edge of a light guide plate shown in FIG. 1 according to an embodiment of the disclosure.

FIG. 1 is an exploded perspective view illustrating a display apparatus 1 according to an embodiment of the disclosure. FIG. 2 is a partially enlarged perspective view illustrating a light source which is arranged along a lower edge of a light guide plate 50 shown in FIG. 1.

Referring to FIGS. 1 and 2, the display apparatus 1 according to the embodiment of the disclosure may include a back chassis 10 which gives hardness of the display apparatus 1, the light guide plate 50 which is disposed in front of the back chassis 10 and emits light from a front surface (hereinafter referred to as a light emission surface 50a) toward a display panel 90, an optical module 60 which is disposed along a side of the light guide plate 50 (hereinafter referred to as a light incidence part 51) and irradiates light onto the light incidence part 51, the display panel 90 which is disposed at an optical distance in front of the light guide plate 50, and a holder 100, which may include a frame, bezel, and/or other supportive structure, that supports edges of the light guide plate 50 and the display panel 90.

The display apparatus 1 may further include a reflective sheet 30 which is disposed on a back surface of the light guide plate 50 and reflects light emitted from the back surface of the light guide plate 50 toward the light guide plate 50 and a diffusion plate 70 which is disposed on a back surface of the display panel 90 and diffuses light emitted from the light emission surface 50a of the light guide plate 50.

Although not shown in the drawings, the display apparatus 1 may include a prism sheet and a protection sheet which are stacked between the diffusion plate 70 and the display panel 90. Also, although not shown in the drawings, a plurality of support members may be disposed for keeping a preset distance for an optical distance between the light guide plate 50 and the diffusion plate 70. The plurality of support members may be fixed to the light guide plate 50.

The optical module 60 may include a substrate 61 which is formed in a narrow and long band shape and a plurality of Light Emitting Diodes (LEDs) 63 which are arranged at distances from one another on a side of the substrate 61.

The light guide plate 50 guides light, which are diffused from the plurality of LEDs 63 toward the light incidence part 51, inside the light guide plate 50 and then emits the light toward the back surface of the display panel 90 through the light emission surface 50a of the light guide plate 50.

The light guide plate 50 includes a light part 53 which is disposed opposite to the light incidence part 51 and corresponds to the light incidence part 51. In this case, light emitted from the light part 53 is reflected by a reflection tape (not shown) included at a lower part of an upper member 130 and then is incident onto the light part 53. The light incident onto the light part 53 is emitted from the light emission surface 50a of the light guide plate 50 and then mostly emitted toward an upper part of the display panel 90.

The light guide plate 50 also emits light through a left surface 55 and a right surface 57. Light emitted from the left surface 55 is guided by a left member 150 of the holder 100 and then mainly emitted toward the display panel 90. Light emitted from the right surface 57 is guided by a right member 170 of the holder 100 and then irradiated onto a right side of the display panel 90. A distribution of light irradiated through the light emission surface 50a may be made to be uniform by forming a plurality of light emission patterns (not shown) in the light emission surface 50a of the light guide plate 50.

Figure 3:
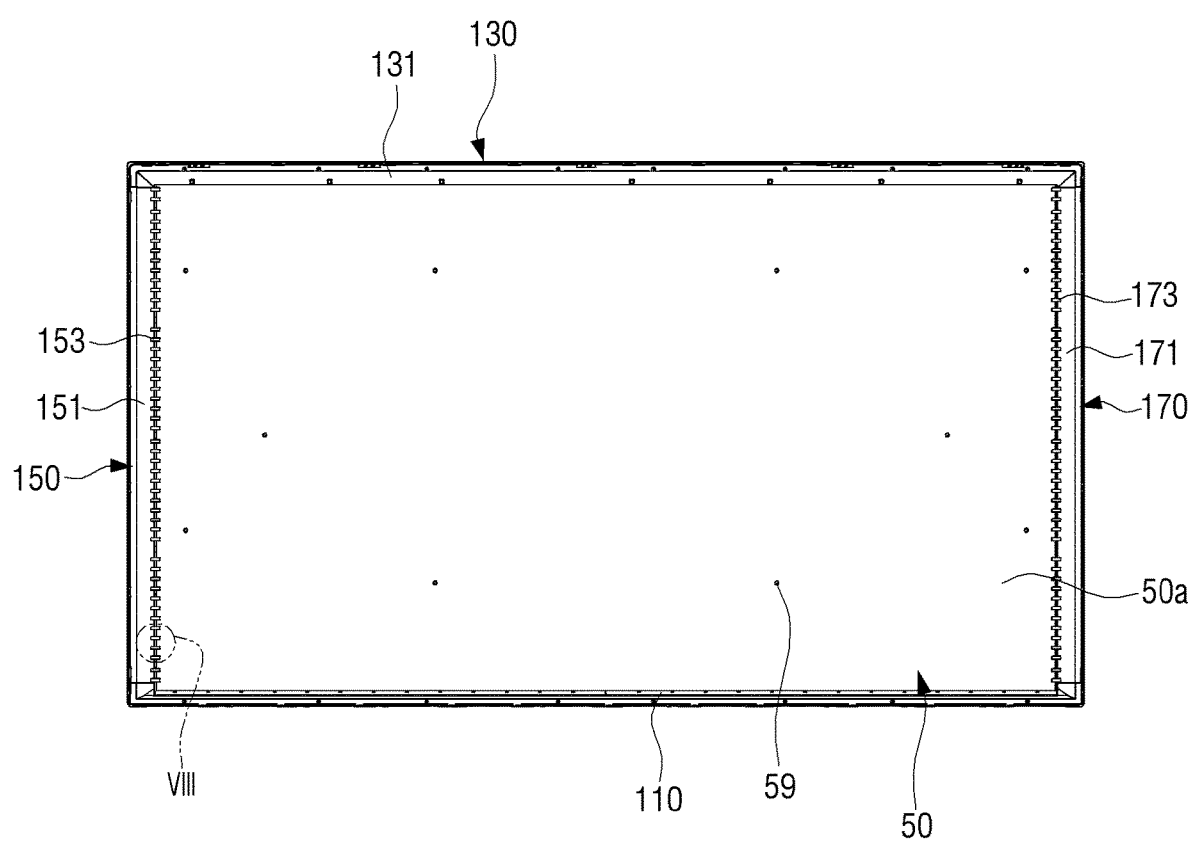
FIG. 3 is a front view illustrating a display apparatus from which a diffusion sheet and a display panel are removed according to an embodiment of the disclosure.
Figure 4:
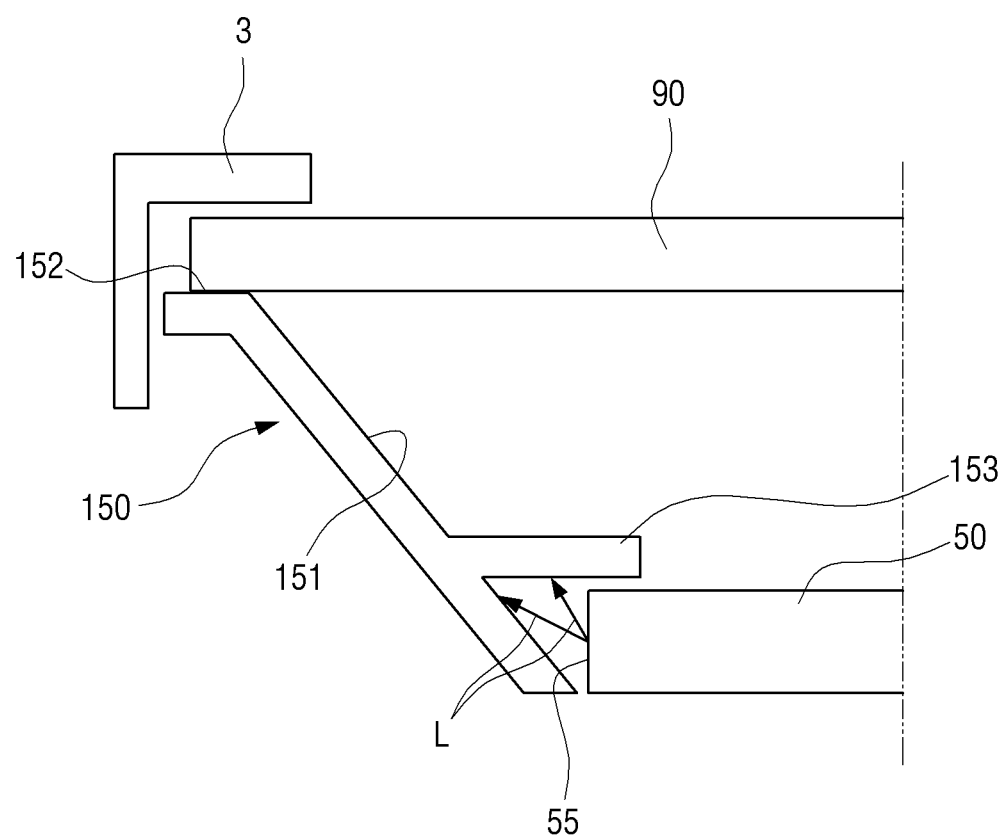
FIG. 4 is a schematic view illustrating light which is emitted from a side of a light guide plate and is covered with light blocking protrusions according to an embodiment of the disclosure.

FIG. 3 is a front view illustrating the display apparatus 1 from which the diffusion sheet and the display panel 90 are removed according to an embodiment. FIG. 4 is a schematic view illustrating light which is emitted from the side of the light guide plate 50 and covered by light blocking protrusions according to an embodiment.

Referring to FIG. 3, the holder 100 may include a lower member 110, the upper member 130, the left member 150, and the right member 170 which are respectively fixed to a lower edge, an upper edge, a left edge, and a right edge of the back chassis 10.

The optical module 60 may be supported inside the lower member 110. In this case, the optical module 60 is covered with the lower member 110 and thus is not exposed to an outside as shown in FIG. 3.

The upper member 130 is disposed adjacent to the light part 53 of the light guide plate 50 (refer to FIG. 1) and includes a front end which supports an upper part of the light emission surface 50a of the light guide plate 50. The left member 150 is disposed adjacent to the left surface 55 of the light guide plate 50 and supports a left side of the light emission surface 50a of the light guide plate 50 through a plurality of light blocking protrusions 153. The right member 170 is disposed adjacent to the right surface 57 of the light guide plate 50 and supports a right side of the light emission surface 50a of the light guide plate 50 through a plurality of light blocking protrusions 173.

Since a size of the light guide plate 50 is smaller than a size of the display panel 90, light emitted to the light emission surface 50a may be guided to an upper edge, a left edge, and a right edge of the back surface of the display panel 90 by respectively forming light guide surfaces 131, 151, and 171 for guiding light on upper surfaces of the upper member 130, the left member 150, and the right member 170.

The light guide surfaces 131, 151, and 171 respectively slope at preset angles, and thus a first end of the light guide surfaces 131, 151, and 171 are respectively disposed adjacent to an upper side, a left side, and a right side of the light guide plate 50, and other end of the light guide surfaces 131, 151, and 171 are respectively disposed adjacent to an upper side, a left side, and a right side of the display panel 90.

Portions of light emitted from the left surface 55 and the right surface 57 of the light guide plate 50 may be covered with the plurality of light blocking protrusions 153 and the plurality of light blocking protrusions 173. According to an embodiment, the plurality of light blocking protrusions 153 and the plurality of light blocking protrusions 173 may be respectively formed in saw-toothed shapes at the left member 150 and the right member 170. According to another embodiment, the plurality of light blocking protrusions 153 and the plurality of light blocking protrusions 173 may be respectively formed to have different shapes.

The plurality of light blocking protrusions 153 and 173 respectively protrude from the light guide surfaces 151 and 171 and have front ends which are positioned in front of the light emission surface 50a of the light guide plate 50.

A preset gap is formed between the left surface 55 of the light guide plate 50 and the left member 150 of the holder 100, and thus light emitted from the left surface 55 of the light guide plate 50 is irradiated onto a left side of the back surface of the display panel 90 along the light guide surface 151 through the preset gap. In this case, as shown in FIG. 4, the plurality of light blocking protrusions 153 covers portions of the left surface 55 of the light guide plate 50 and thus covers a portion of light (L) emitted from the left surface 55 of the light guide plate 50. Therefore, a total amount of light emitted from the left surface 55 of the light guide plate 50 is reduced in comparison to other implementations. In FIG. 4, a bezel 3 is provided in front of the display panel 90 of the display apparatus 1.

According to an embodiment, the light emitted at first portions of the left surface 55 covered by the plurality of protrusions is blocked, while the light emitted at second portions of the left surface 55 not covered by the plurality of protrusions is permitted.

According to an embodiment, the light guide surface 151 guides the light emitted from the left surface 55 toward the display panel 90.

Similarly, a preset gap is formed between the right surface 57 of the light guide plate 50 and the right member 170 of the holder 100, and thus light emitted from the right surface 57 of the light guide plate 50 is irradiated onto a right side of the back surface of the display panel 90 along the light guide surface 171 through the preset gap. In this case, the plurality of light blocking protrusions 153 covers portions of the right surface 57 of the light guide plate 50 and thus covers the right surface 57 of the light guide plate 50. Therefore, a total amount of light emitted from the right surface 57 of the light guide plate 50 is reduced in comparison with other implementations.

As described above, according to an embodiment of the disclosure, a light bounce phenomenon, where a left side and a right side of a screen look brighter than a central portion of the screen due to light emitted from the left surface 55 and the right surface 57 of the light guide plate 50, is addressed by reducing a total amount of light emitted from the left surface 55 and the right surface 57 of the light guide plate 50 through the plurality of light blocking protrusions 153 and 173 formed at the left member 150 and the right member 170 of the holder 100.

The right member 170 which is symmetrical to the left member 150 has the same structure as the left member 150, and thus a description thereof is omitted. Hereinafter, the left member 150 which may cover a portion of light emitted from the left surface 55 of the light guide plate 50 will be described in detail with reference to FIGS. 5 through 8.

Figure 5:
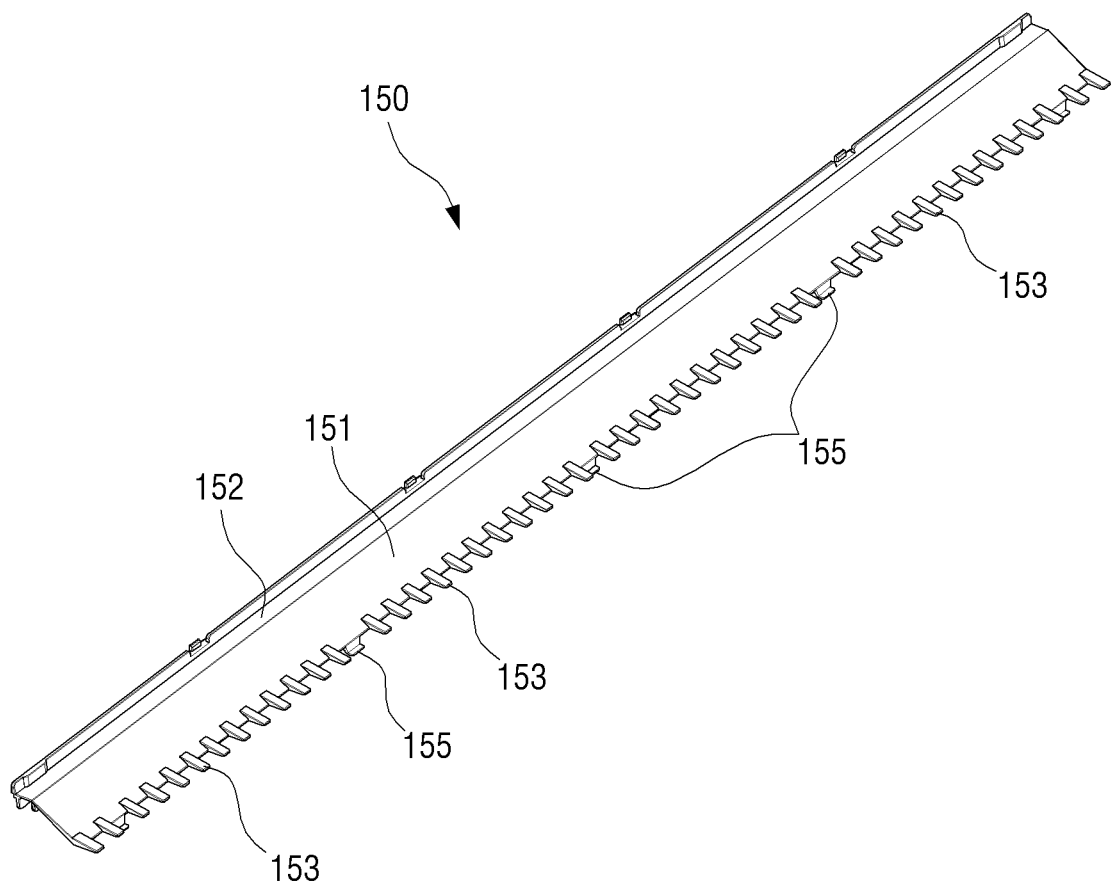
FIG. 5 is a perspective view illustrating a left member of a holder shown in FIG. 3 according to an embodiment of the disclosure.
Figure 6:
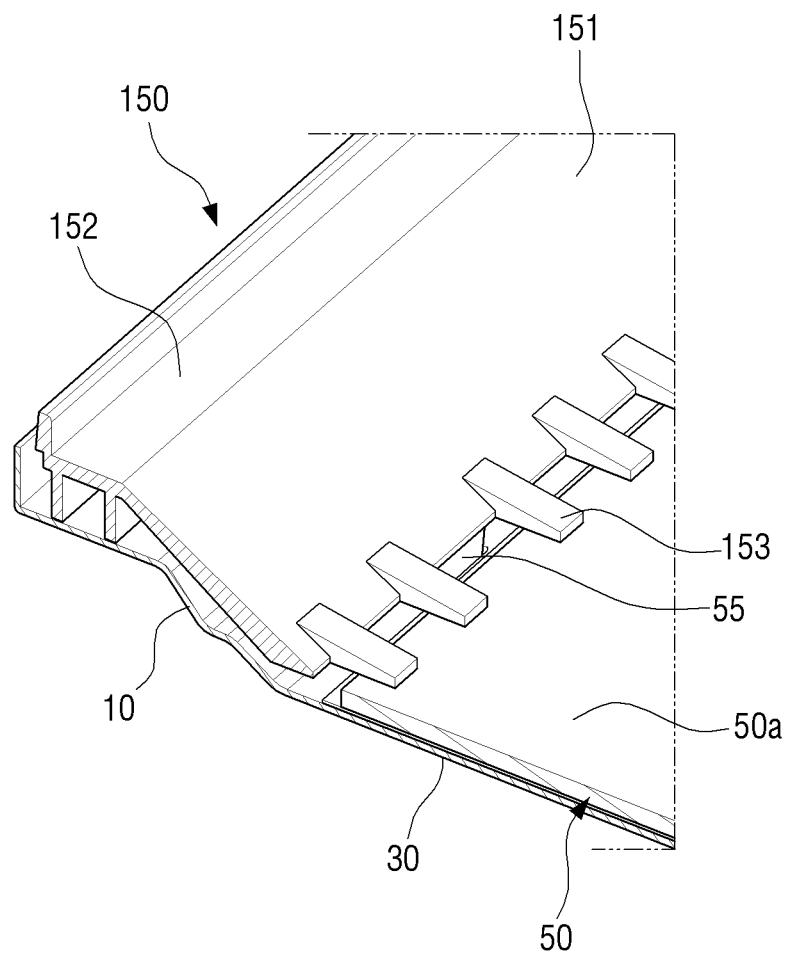
FIG. 6 is a partially cut perspective view illustrating the left member of the holder which is arranged along a left edge of the light guide plate according to an embodiment of the disclosure.
Figure 7:
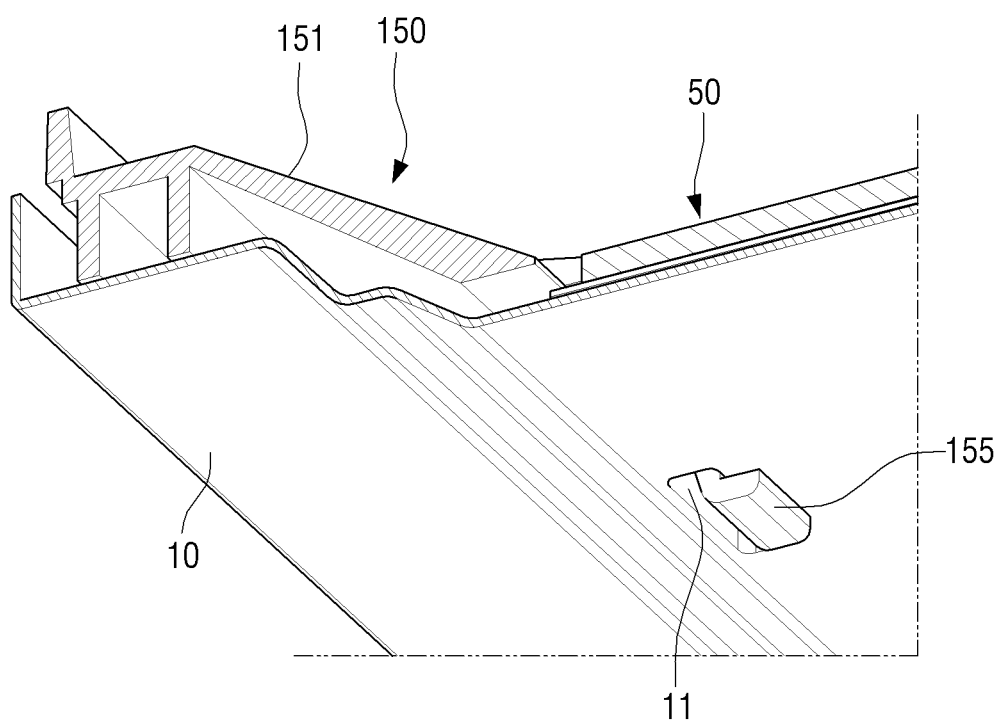
FIG. 7 is a partially cut perspective view illustrating hooks of the holder which are combined into combination holes of a back chassis according to an embodiment of the disclosure.
Figure 8:
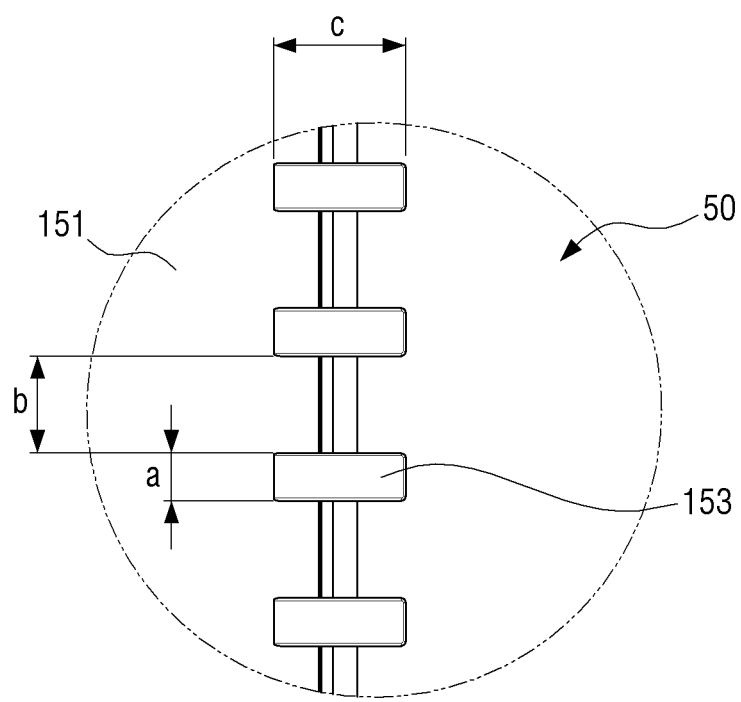
FIG. 8 is an enlarged view illustrating part VIII shown in FIG. 3, i.e., light blocking protrusions which are formed at the left member of the holder according to an embodiment of the disclosure.

FIG. 5 is a perspective view illustrating the left member 150 of the holder 100 shown in FIG. 3 according to an embodiment. FIG. 6 is a partially cut perspective view illustrating the left member 150 of the holder 100 which is disposed along a left edge of the light guide plate 50 according to an embodiment. FIG. 7 is a partially cut perspective view illustrating hooks 155 of the holder 100 which are combined into combination holes 11 of the back chassis 10 according to an embodiment. FIG. 8 is an enlarged view illustrating part VIII of FIG. 3, i.e., the light blocking protrusions 153 which are formed at the left member 150 of the holder 100 according to an embodiment.

Referring to FIG. 5, the left member 150 of the holder 100 may be formed in a length corresponding to a length of the left (edge) surface 55 of the light guide plate 50. That is, the length of the holder 100 is same as the length of the left surface 55 of the light guide plate 50. According to another embodiment, the length of the holder 100 may be different from the length of the left surface 55 of the light guide plate 50.

The light guide surface 151 is formed on an upper surface of the left member 150 of the holder 100 along a longitudinal direction of the left member 150, and a placing surface 152, on which the left side of the back surface of the display panel 90 is placed, is formed at an uppermost end adjacent to the light guide surface 151 along the longitudinal direction of the left member 150. Although not shown in the drawings, the diffusion plate 70 which is disposed on the back surface of the display panel 90 may be placed on the placing surface 152.

Also, the left member 150 of the holder 100 includes the plurality of light blocking protrusions 153 which are formed at distances from one another on the light guide surface 151 along the longitudinal direction of the left member 150.

Referring to FIG. 6, the light blocking protrusions 153 may be formed to have same shapes, extend from a lower part of the light guide surface 151 toward the light guide plate 50, and protrude in enough lengths to cover the light emission surface 50*a* of the light guide plate 50. According to another embodiment, the shapes of the light blocking protrusions 154 may be different.

A plurality of hooks 155 are formed at distances from one another at a lower surface of the left member 150 of the holder 100. As shown in FIG. 7, the hooks 155 are respectively detachably combined into a plurality of combination holes 11 formed in the back chassis 10. Therefore, the left member 150 of the holder 100 may be combined into the back chassis 10 through the plurality of hooks 155 and thus may support a left side of the light emission surface 50*a* of the light guide plate 50 through the plurality of light blocking protrusions 153.

Referring to FIG. 8, the light blocking protrusions 153 may adjust an amount of light emitted from the left surface 55 of the light guide plate 150 by variously designing widths a and distances b of the light blocking protrusions 153.

In detail, an amount of light emitted from the left surface 55 of the light guide plate 50 may be adjusted by providing an optimized structure on the screen through an adjustment of a ratio between widths and distances of light blocking protrusions. In this case, a light emission amount E of the left surface 55 of the light guide plate 50 may be expressed as in Equation 1 below.

$$E=b/(a+b)$$

However, if the width a of the light blocking protrusion 153 is higher than or equal to 10 mm, light may be recognized as dark spots. Therefore, a screen recognition may be tested by designing the width a of the light blocking protrusion 153 smaller than 10 mm and manufacturing a preset sample per each light emission amount.

Also, an amount of light emitted from the left surface 55 of the light guide plate 50 may be adjusted by freely designing the distances b between the light blocking protrusions 153 adjacent to each other.

According to an embodiment, if the light blocking protrusion 153 are formed to have lengths c so as to cover the light emission surface 50*a* of the light guide plate 50, the light blocking protrusions 153 prevent the light guide plate 50 from coming off when the light guide plate 50 expands due to heat generated when driving the plurality of LEDs 63 and simultaneously offsets bright lines appearing on the left surface 55 of the light guide plate 50.

In other words, the left surface 55 of the light guide plate 50 may emit light externally but may simultaneously reflect the light into the light guide plate 50. Due to this, weak bright lines appear inside the left surface 55 of the light guide plate 50 and may vary with a cut state of the left surface 55 of the light guide plate 50. For instance, when the left surface 55 of the light guide plate 50 is cut in a mirror-like processing state, an amount of light reflected inwards increases, and thus internal bright lines are relatively strongly recognized. On the other hand, when the left surface 55 of the light guide plate 50 is cut with the teeth (not shown) of a cutter being worn out, the left surface 55 of the light guide plate 50 may be roughly cut, and bright lines are offset through scattering of light. Therefore, relatively weak bright lines are recognized.

Internal bright lines varying with roughness of the left surface 55 of the light guide plate 50 may be controlled by adjusting the lengths c of the light blocking protrusions 153. For instance, by increasing the lengths c by lengths in which the internal bright lines are generated, and covering the light guide plate 50, the variance in the internal bright lines may be reduced.

Figure 9:
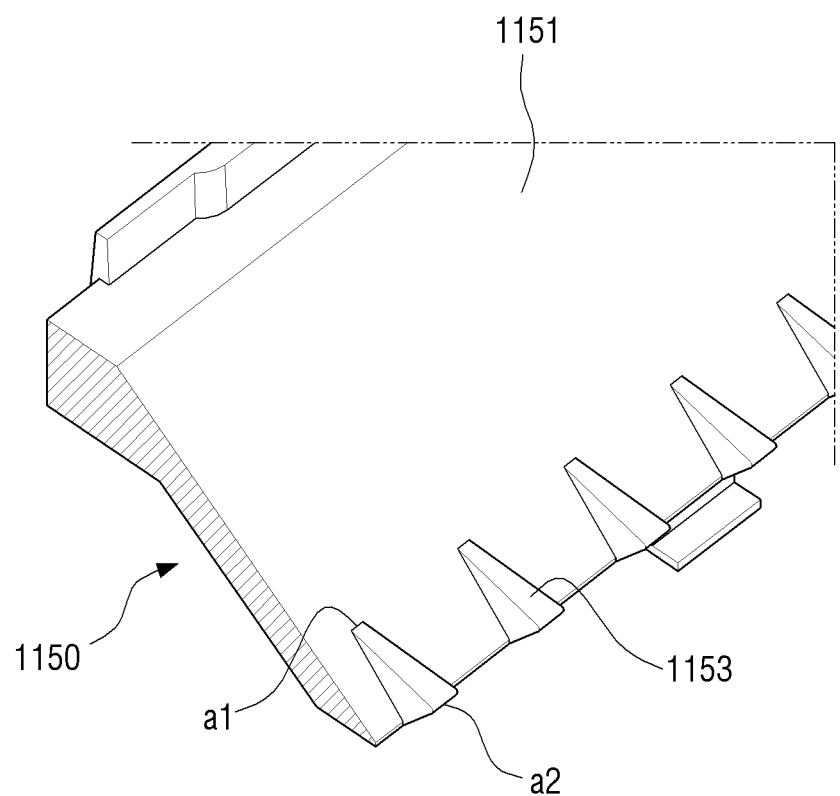
FIG. 9 is a partially cut perspective view illustrating a plurality of light blocking protrusions which are formed in widths gradually narrowing from the light guide plate toward the left member of the holder according to an embodiment of the disclosure.
Figure 10:
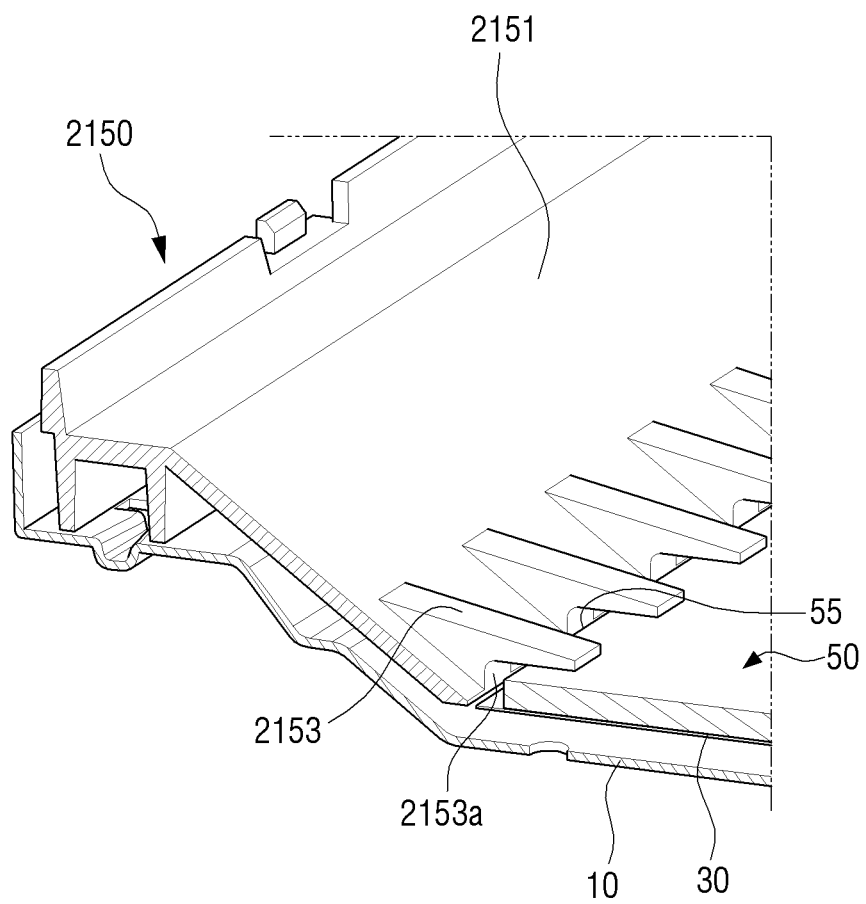
FIG. 10 is a partially cut perspective view illustrating lower parts of a plurality of light blocking protrusions which are cut in "⌐" shapes according to an embodiment of the disclosure.

Also, as shown in FIGS. 9 and 10, light blocking protrusions may assist side light in being adjusting according to shapes thereof.

FIG. 9 is a partially cut perspective view illustrating a plurality of light blocking protrusions 1153 which are formed in widths gradually narrowing from the light guide plate 50 (i.e., width a2) toward a left member 1150 of a holder (width a1). FIG. 10 is a partially cut perspective view illustrating lower parts 2153a of a plurality of light blocking protrusions 2153 which are cut in "┐" shapes.

Referring to FIG. 9, the plurality of light blocking protrusions 1153 which are formed at the left member 1150 may have lozenge shapes which gradually narrow from the light guide plate 50 toward a light slope 1151.

The light blocking protrusions 1153 formed as described above may have front ends (a2) which do not narrow and thus may keep a light blocking ratio equal to that of light blocking protrusions having rectangular shapes. Also, the light blocking protrusions 1153 may have back ends (a1) which narrow and thus assist light leaking between adjacent light blocking protrusions 1153 in being better scattered. In this case, the plurality of light blocking protrusions 1153 do not show an effect of directly blocking light emitted from the left surface 1150 of the light guide plate 50 but may be applied when precisely controlling light.

Referring to FIG. 10, if the lower parts 2153a of the light blocking protrusions 2153 formed at a left member 2150 are cut in "┐" shapes, a preset space is formed between the lower parts 2153a of the light blocking protrusions 2153 and the light guide plate 50. Therefore, since light emitted from the left surface 55 of the light guide plate 50 is reflected from the lower parts 2153a, which may or may not be of reflective material or coated with reflective material, of the light blocking protrusions 2153, a ratio of reused light increases more than when forming lower parts in approximately diagonal line shapes not in the "┐" shapes, thereby improve light efficiency.

Reference numeral 2151 undescribed in FIG. 10 denotes a light guide surface.

Figure 11:
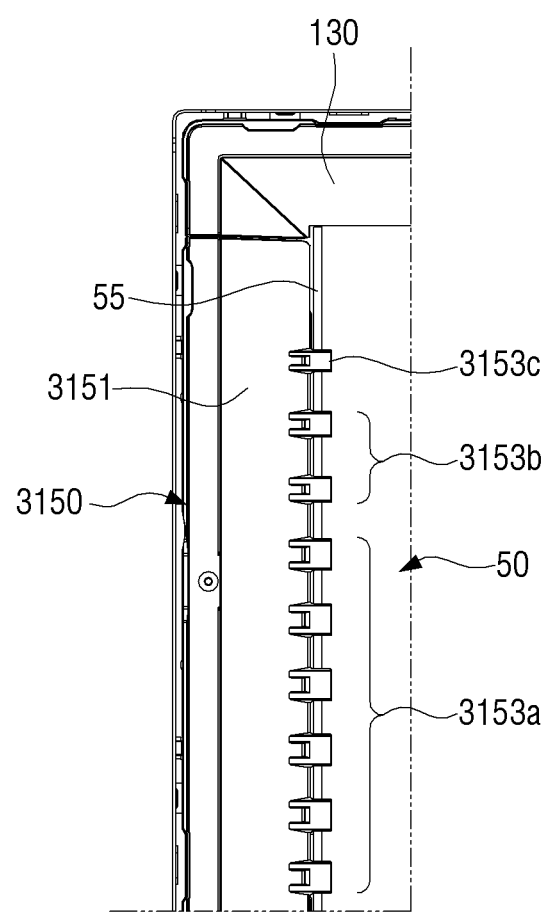
FIG. 11 is a partially cut front view illustrating a plurality of light blocking protrusions which are formed in different widths by group according to an embodiment of the disclosure.

FIG. 11 is a partially cut front view illustrating a plurality of light blocking protrusions which are formed in different widths by group.

Referring to FIG. 11, a plurality of light blocking protrusions 3153a, 3153b, and 3153c may be formed at a left member 3150 in different widths by group.

In other words, a first group of light blocking protrusions 3153a which are more adjacent to the light incidence part 51 of the light guide plate 50 than a second group of light blocking protrusions 3153 b may be formed in wider widths than the second group of light blocking protrusions 3153b. Also, the second group of light blocking protrusions 3153b may be formed in wider widths than a third group of light blocking protrusion 3153c. One light blocking protrusion 3153c belonging to the third group is formed in FIG. 11 but is not limited thereto. Therefore, a plurality of light blocking protrusions 3153c may be formed.

Also, light emitted from the left surface 55 of the light guide plate 50 may have a weak intensity as being far away from the optical module 60 (or an amount of light may be reduced). In consideration of this point, a dark portion may be prevented from being formed at an upper corner of a screen by lowering an arrangement density of light blocking protrusions toward a position adjacent to the upper member 130 and then minimizing a reduction in an amount of light caused by light blocking protrusions.

Reference numeral 315a undescribed in FIG. 11 denotes a light guide surface.

Moreover, although not shown in the drawings, distances between a plurality of light blocking protrusions may gradually widen by group as being far away from an optical module. Also, distances between all light blocking protrusions may gradually widen regardless of group as being far away from the optical module.

Figure 12:
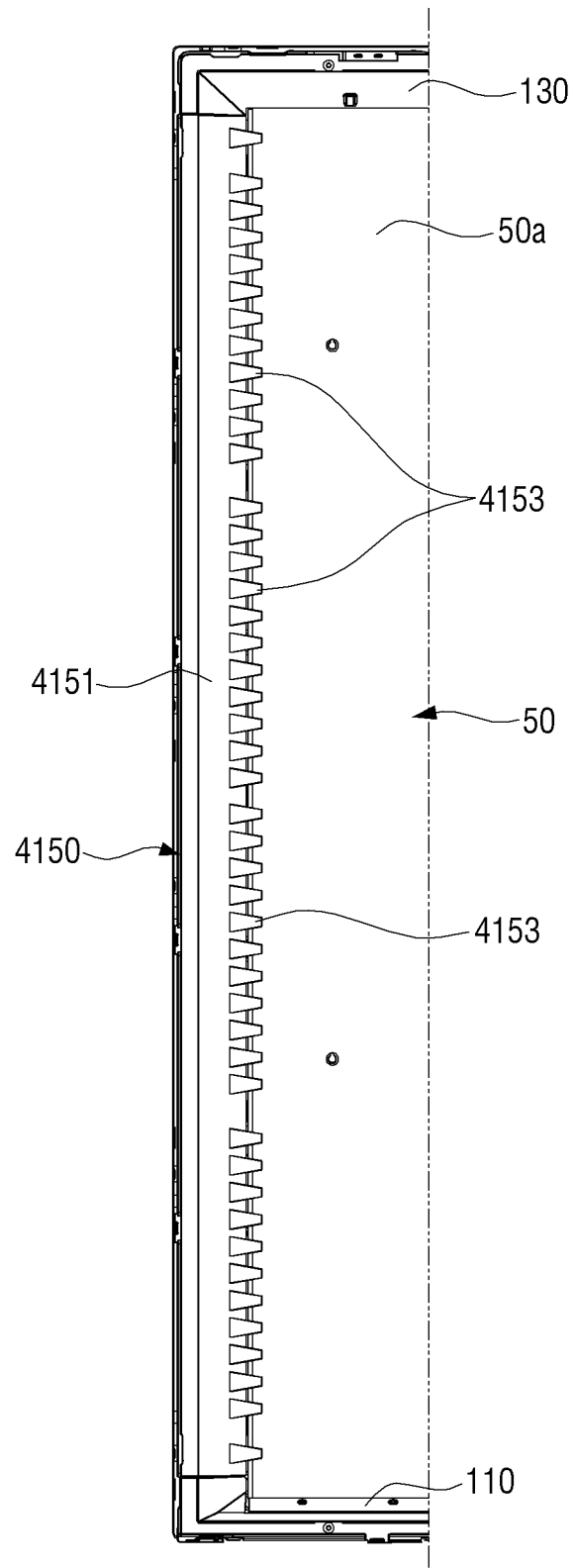
FIG. 12 is a partially cut front view illustrating a plurality of light blocking protrusions which are formed in widths gradually narrowing from the left member of the holder toward the light guide plate according to an embodiment of the disclosure.

FIG. 12 is a partially cut front view illustrating a plurality of light blocking protrusions 4153 which are formed in widths which gradually narrowing from a left member 4150 of a holder toward the light guide plate 50.

Referring to FIG. 12, a plurality of light blocking protrusions 4153 may be formed in lozenge shapes at a left member 4150. The light blocking protrusions 4153 may be formed in widths narrowing from the left member 4150 toward the light guide plate 50. In this case, the light blocking protrusions 4153 may protrude in the same lengths enough to cover portions of the light emission surface 50a of the light guide plate 50.

Reference numerals 110, 130, and 4151 undescribed in FIG. 12 respectively denote a lower member, an upper member, and a light guide surface.

Figure 13:
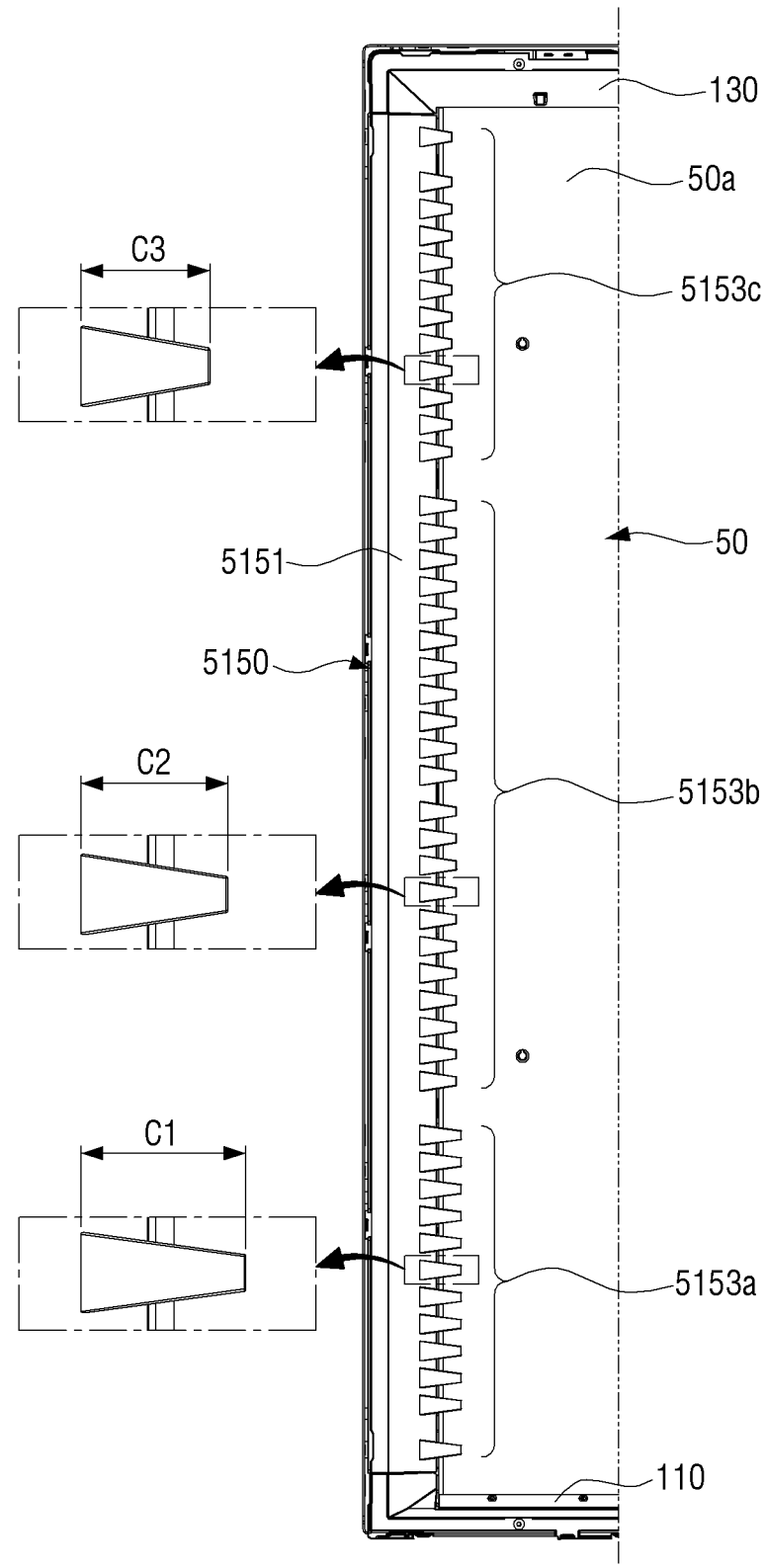
FIG. 13 is a partially cut front view illustrating a plurality of light blocking protrusions which protrude in different lengths by group according to an embodiment of the disclosure.

FIG. 13 is a partially cut front view illustrating a plurality of light blocking protrusions which protrude in different lengths by group.

Referring FIG. 13, a plurality of light blocking protrusions 5153a, 5153b, and 5153c may be sequentially formed at a left member 5150 from a first group adjacent to the light incidence part 51 of the light guide plate 50 of FIG. 1 to second and third groups in a direction far away from the light incidence part 51 of the light guide plate 50.

Lengths c1 of the light blocking protrusions 5153a belonging to the first group may be longer than lengths c2 of the light blocking protrusions 5153b belonging to the second group. Also, the lengths c2 of the light blocking protrusions 5153b belonging to the second group may be longer than lengths c3 of the light blocking protrusions 5153c belonging to the third group.

As described above, a dark part may be prevented from being formed at an upper corner of a screen by forming light blocking protrusions, which belong to a group arranged far away from an optical module, in protruding lengths which gradually shorten.

Reference numerals 110, 130, and 5151 undescribed in FIG. 13 respectively denote a lower member, an upper member, and a light guide surface.

Figure 14:
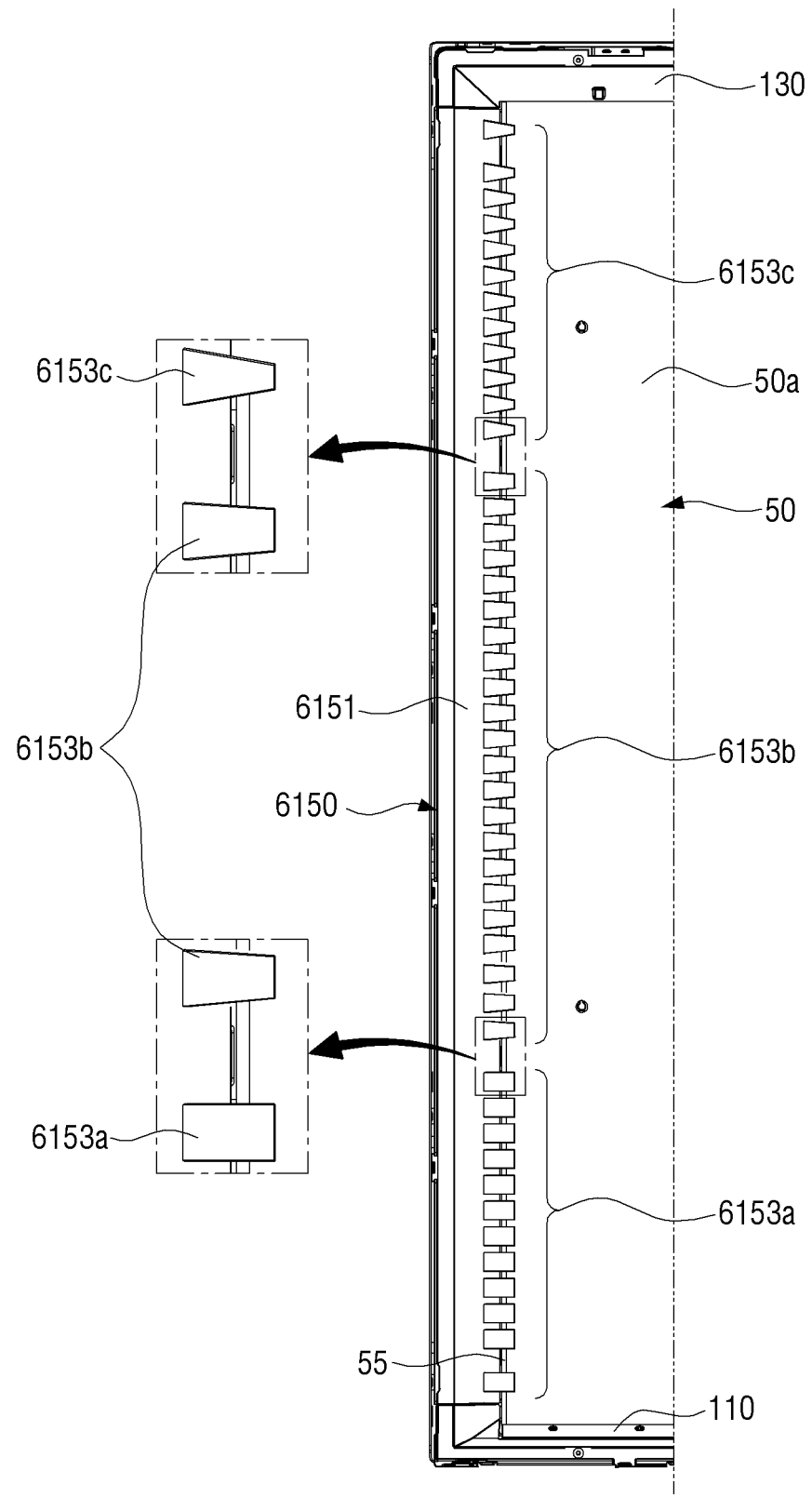
FIG. 14 is a partially cut front view illustrating a plurality of light blocking protrusions which are formed in different shapes by group according to an embodiment of the disclosure.

FIG. 14 is a partially cut front view illustrating a plurality of light blocking protrusions which are formed in different shapes by group.

Referring to FIG. 14, a plurality of light blocking protrusions 6153a, 6153b, and 6153c may be formed at a left member 6150 in different shapes by group. In this case, light blocking protrusions belonging to the same group may be formed in the same shapes.

A first group of light blocking protrusions 6153a adjacent to the light incidence part 51 of the light guide plate 50 of FIG. 1 may be all formed in rectangular shapes. A second group of light blocking protrusions 6153b, which are arranged farther away from the light incidence part 51 of the light guide plate 50 than the first group, may be all formed in lozenge shapes. The third group of light blocking protrusions 6153c, which are arranged farther away from the light incidence part 51 of the light guide plate 50 than the second group, may be all formed in lozenge shapes.

In this case, front ends of the light blocking protrusions 6153c, which belong to the third group and are adjacent to the light guide plate 50, may be formed in narrower widths than the second group of light blocking protrusions 6153b.

As described above, a degree of covering light emitted from the left surface 55 of the light guide plate 50 may be freely adjusted by forming light blocking protrusions in different shapes by group. Through this, an amount of light irradiated onto a whole part or each part of a back surface of a display panel may be minutely controlled.

Reference numerals 110, 130, and 6151 undescribed in FIG. 14 respectively denote a lower member, an upper member, and a light guide surface.

In the present exemplary embodiment, an amount of light emitted from a left surface of a light guide plate may be adjusted by appropriately adjusting heights of light blocking protrusions. In this case, if the heights of the light blocking protrusions are lower than a height of the light guide plate, the light blocking protrusions may not perform a role of supporting the light guide plate. Hereinafter, an example of adjusting heights of light blocking protrusions will be described in detail with reference to FIGS. 15 through 17.

Figure 15:
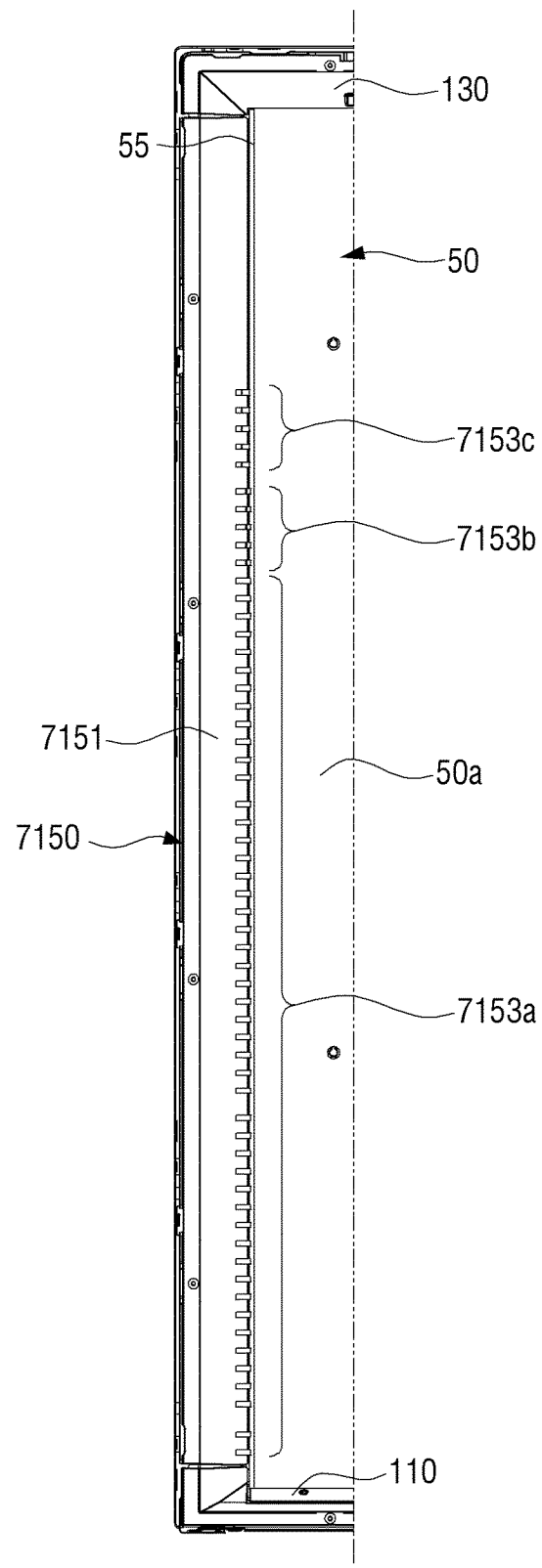
FIG. 15 is a partially cut front view illustrating a plurality of light blocking protrusions which protrude in different heights by group according to an embodiment of the disclosure.
Figure 16:
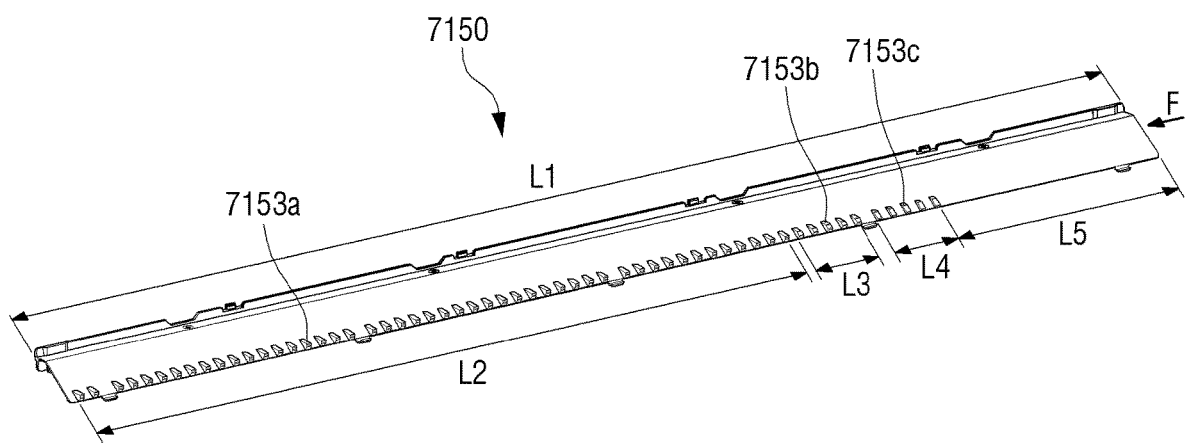
FIG. 16 is a perspective view illustrating a holder shown in FIG. 15 according to an embodiment of the disclosure.
Figure 17:
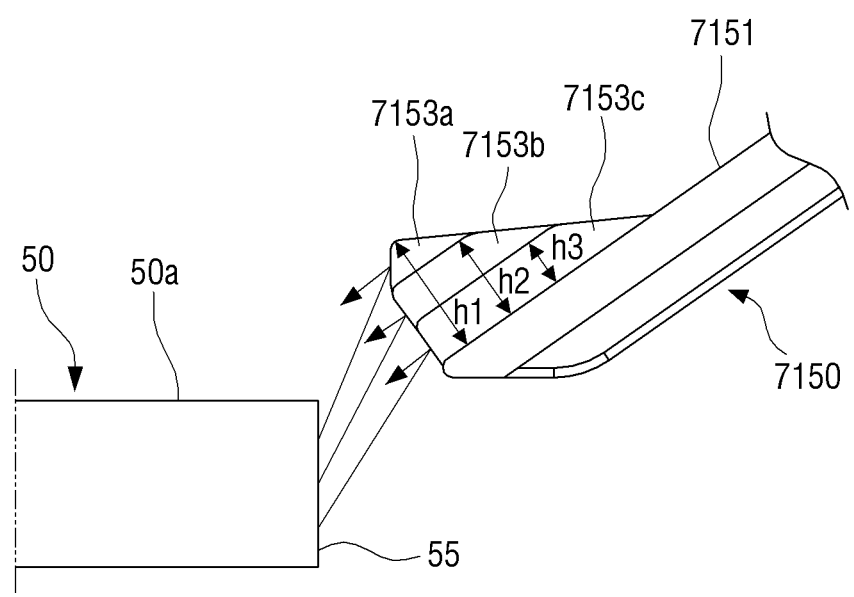
FIG. 17 is a side view seen from direction F shown in FIG. 16, i.e., comparing heights of light blocking protrusions by group according to an embodiment of the disclosure.

FIG. 15 is a partially cut front view illustrating a plurality of light blocking protrusions which are formed in different protruding heights by group. FIG. 16 is a perspective view illustrating a holder shown in FIG. 15. FIG. 17 is a side view seen from direction F shown in FIG. 16, i.e., comparing heights of light blocking protrusions by group.

Referring to FIG. 15, light blocking protrusions 7153a, 7153b, and 7153c respectively belonging to first through third groups may be formed on a light guide surface 7151 formed at a left member 7150.

As described above, an amount of light emitted from the left surface 55 of the light guide plate 50 increases toward a side where an optical module is disposed but decreases toward a side which is far away from the optical module. In this case, the optical module is disposed inside the lower member 110. Therefore, an amount of light emitted from the left surface 55 of the light guide plate 50 may be freely adjusted by differently forming light blocking protrusions in different heights by group based on amounts of light emitted from respective portions of the left surface 55 of the light guide plate 50 and adjusting an arrangement density of the light blocking protrusions a side which is far away from the optical module.

Referring to FIG. 16, a first group of light blocking protrusions 7153a may occupy an area corresponding to a length L2 of about ⅔ of a total length L1 of the left member 7150. A second group of light blocking protrusions 7153b may occupy an area corresponding to a length L3 of about ⅓ of the total length L1 of the left member 7150. A third group of light blocking protrusions 7153c may occupy an area corresponding to a length L4 of about ⅕ of the total length L1 of the left member 7150.

If the light blocking protrusions 7153a, 7153b, and 7153c, which respectively belong to the first through third groups and are formed in the same widths, are arranged as shown in FIG. 16, an amount of light emitted from the left surface 55 of the light guide plate 50 may keep 70% of a total amount of emitted light to ⅔ from the light incidence part 51 of the light guide plate 50.

In addition, the first group of light blocking protrusions (7153a) may be arranged in a first length (L2) of the holder, the second group of light blocking protrusions (7153b) may be arranged in a second length (L3) of the holder, and the third group of light blocking protrusions (7153c) may be arranged in a third length (L4) of the holder, and the second length (L3) may be smaller than the first length (L2), and may be bigger than the third length (L4).

Also, since an amount of light emitted from the left surface 55 of the light guide plate 50 decreases as being gradually far away from the light incidence part 51 of the light guide plate 50, as shown in FIG. 17, heights h2 of the light blocking protrusions 7153b belonging to the second group are lower than heights h1 of the light blocking protrusions 7153a belonging to the first group, and heights h3 of the light blocking protrusions 7153c belonging to the third group are lower than the heights h2 of the light blocking protrusions 7153b belonging to the second group. In addition, light blocking protrusions may not be formed but may be kept empty by a preset length L5 (refer to FIG. 16) at a portion of the left member 7150 furthermost from the light incidence part 51 of the light guide plate 50.

A decrease in an amount of light emitted from the left surface 55 of the light guide plate 50 may be minimized through the structure of the left member 7150 as described above. A screen may be kept mostly uniformly bright from a lower end thereof to an upper end thereof.

Moreover, although not shown in the drawings, the heights h1, h2, and h3 of the light blocking protrusions 7153a, 7153b, and 7153c respectively belonging to the first through third groups may be differently formed, and widths of the light blocking protrusions 7153a, 7153b, and 7153c may be differently formed as described above. In other words, the first group of light blocking protrusions 7153a may be formed in widest widths, and the third group of light blocking protrusions 7153c may be formed in narrowest widths.

According to the embodiments of the disclosure as described above, light emitted from a light emission surface of a light guide plate and light emitted from a side of the light guide plate may be used. Moreover, by forming a plurality of light blocking protrusions at left and right members of a holder, an amount of light emitted to the side of the light guide plate may be freely adjusted. Therefore, when using the light guide plate smaller than a size of a screen, brightness of the screen may be embodied as being totally uniform.

In addition, according to the embodiments of the disclosure as described above, the light guide plate may be fixed by using a holder, and thus an additional apparatus for fixing the light guide plate may be omitted. Therefore, manufacturing and assembling processes may be simple, and material cost may be reduced.

The foregoing embodiments and advantages are merely exemplary and are not to be construed as limiting the disclosure. The present teaching can be readily applied to other types of apparatuses. Also, the description of the embodiments of the disclosure is intended to be illustrative, and not to limit the scope of the claims, and many alternatives, modifications, and variations will be apparent to those skilled in the art.

What is claimed is:

1. A display apparatus comprising:
a display panel;
a light guide plate disposed behind the display panel, the light guide plate being lengthwise or widthwise smaller than the display panel;
a light source configured to emit light to a first lateral surface of the light guide plate;
a back chassis disposed behind the light guide plate and configured to accommodate a back surface of the light guide plate; and
a support structure disposed along a second lateral surface of the light guide plate different from the first lateral surface of the light guide plate, the support structure comprising a light blocking protrusion configured to block a portion of the second lateral surface,
wherein the light blocking protrusion comprises a plurality of light blocking protrusions which are spaced apart from each other along a lengthwise direction of the support structure and protrude from an end of the support structure towards the light guide plate, and
wherein the plurality of light blocking protrusions are arranged to allow a light to pass between adjacent light blocking protrusions, among the light blocking protrusions, at an edge portion of the second lateral surface, the second lateral surface being an upper surface of the light guide plate,
wherein the plurality of light blocking protrusions are further arranged to allow the light to pass between adjacent light blocking protrusions, among the light blocking protrusions, at a side portion of a third lateral surface, the third lateral surface being a side surface of the light guide plate perpendicular to the second lateral surface.

2. The display apparatus of claim 1, wherein a distance between adjacent light blocking protrusions, among the plurality of light blocking protrusions is equal.

3. The display apparatus of claim 1, wherein a first distance between a first pair of light blocking protrusions of the plurality of light blocking protrusions which are adjacent to each other is smaller than a second distance between a second pair of light blocking protrusions which are adjacent to each other, the light source being closer to the first pair of light blocking protrusions than the second pair of light blocking protrusions.

4. The display apparatus of claim 1, wherein a first distance measured between adjacent light blocking protrusions, among the plurality of light blocking protrusions, gradually increases as a second distance measured between the light source and the respective adjacent light blocking protrusions increases.

5. The display apparatus of claim 1, wherein a width of a first plurality of light blocking protrusions, among the plurality of light blocking protrusions is wider than a width of a second plurality of light blocking protrusions, among the plurality of light blocking protrusions, the light source being closer to the first plurality of light blocking protrusions than the second plurality of light blocking protrusions.

6. The display apparatus of claim 1, wherein the plurality of light blocking protrusions protrude from the support structure toward the light guide plate and cover portions of a light emission surface of the light guide plate.

7. The display apparatus of claim 6, wherein the plurality of light blocking protrusions has widths which gradually decrease toward the light guide plate.

8. The display apparatus of claim 1, wherein lengths of the plurality of light blocking protrusions which protrude toward the light guide plate gradually shorten as a distance between the light source and a respective light blocking protrusion increases.

9. The display apparatus of claim 1, wherein the plurality of light blocking protrusions comprise a first group of light blocking protrusions which are adjacently disposed with a first distance between each other and a second group of light blocking protrusions which are disposed farther away from the light source than the first group, and are adjacently disposed with a second distance between each other.

10. The display apparatus of claim 1, wherein a lower portion of each of the plurality of light blocking protrusions form an inverted L-shape, which reflects light to a first end surface of the light guide plate.

11. The display apparatus of claim 1, wherein a first height of a first light blocking protrusion, among the plurality of light blocking protrusions higher than a second height of a second light blocking protrusion, among the plurality of light blocking protrusions, the light source being closer to the first light blocking protrusion than the second light blocking protrusion.

12. The display apparatus of claim 1, wherein the plurality of light blocking protrusions has heights which are gradually lowered as a distance between the light source and a respective light blocking protrusion increases.

13. The display apparatus of claim 1, wherein the plurality of light blocking protrusions comprises a first group of light blocking protrusions which have a first height and a second group of light blocking protrusions which have a second height lower than the first height,
wherein the light source is closer to the first group than the second group.

14. The display apparatus of claim 13, wherein the plurality of light blocking protrusions further comprises a third group of light blocking protrusions which are disposed farther away from the light source than the second group and have a third height lower than the second height.

15. The display apparatus of claim 14, wherein the first group of light blocking protrusions is arranged in a first area of the support structure, the second group of light blocking protrusions is arranged in a second area of the support structure, and the third group of light blocking protrusions is arranged in a third area of the support structure, the first, second and third groups of the light blocking protrusions are arranged to gradually reduce an amount of light emitted from the second lateral surface as distance from the light source increases.

16. The display apparatus of claim 15, wherein the support structure comprises a fourth area where the plurality of light blocking protrusions are not formed, the fourth area being adjacent to a side of the light guide plate positioned opposite to the first lateral surface of the light guide plate.

17. The display apparatus of claim 1, wherein the support structure comprises a light guide surface which slopes from the light guide plate toward the display panel and guides light diffused from the first lateral surface of the light guide plate toward the display panel,
wherein the plurality of light blocking protrusions protrude from the light guide surface.

18. The display apparatus of claim 1, further comprising:
an additional support structure disposed along third lateral surface of the light guide plate positioned opposite to the second lateral surface of the light guide plate and configured to block a portion of the third lateral surface.

19. The display apparatus of claim 1, wherein a physical feature of a first light blocking protrusion, among the plurality of light blocking protrusions, and a physical feature of a second light blocking protrusion, among the plurality of light blocking protrusions are different.

20. A display apparatus comprising:
a display panel;
a light guide plate disposed behind the display panel, the light guide plate being lengthwise or widthwise smaller than the display panel;
a light source configured to emit light to the light guide plate;
a back chassis disposed behind the light guide plate and configured to accommodate a back surface of the light guide plate;
a left support structure disposed along a left end of the light guide plate; and
a right support structure disposed along a right end of the light guide plate,
wherein each of the left support structure and right support structure comprises a plurality of light blocking protrusions which respectively protrude to block a portion of the light guide plate along the left end and a portion of the light guide plate along the right end,
wherein the plurality of light blocking protrusions are arranged to allow light to pass between adjacent light blocking protrusions, among the light blocking protrusions, at an edge portion of an upper lateral surface of the light guide plate,
wherein the plurality of light blocking protrusions are further arranged to allow the light to pass between adjacent light blocking protrusions, among the light blocking protrusions, at a side portion of a side lateral surface of the light guide plate perpendicular to the upper lateral surface of the light guide plate.

* * * * *